United States Patent [19]

Nuss

[11] 3,848,309

[45] Nov. 19, 1974

[54] PULLEY METHOD OF MANUFACTURE

[75] Inventor: Christopher Nuss, Warren, Mich.

[73] Assignee: Chrysler Corporation, Highland Park, Mich.

[22] Filed: Nov. 12, 1973

[21] Appl. No.: 415,043

[52] U.S. Cl.............. 29/159 R, 29/416, 74/230.8, 113/1 M, 113/116 D
[51] Int. Cl....... B21d 53/26, B21k 1/28, B21k 1/42
[58] Field of Search............ 29/159 R, 416, 159.01, 29/159.03; 74/230.8, 230.13, 230.14, 449; 113/1 M, 116 D

[56] References Cited
UNITED STATES PATENTS

| | | | |
|---|---|---|---|
| 2,069,068 | 1/1937 | Horn | 29/159.03 |
| 2,787,914 | 4/1957 | Nelson | 74/230.8 |
| 2,846,893 | 8/1958 | Bagley | 74/230.8 |
| 2,905,004 | 9/1959 | Rose | 29/159 R X |
| 3,108,838 | 10/1963 | McCleary | 29/159.01 X |

Primary Examiner—C. W. Lanham
Assistant Examiner—Victor A. DiPalma
Attorney, Agent, or Firm—Talburtt & Baldwin

[57] ABSTRACT

A wheel having a hub and a peripheral channel for a tire or pulley belt is formed from sheet material by forming a bowl having a base to comprise the hub and having an integral side flange that terminates outwardly from the base in a first peripheral edge flange. The latter flange is removed from the bowl to provide, when re-assembled on the bowl in axially reversed relationship, one side of the peripheral channel. The bowl is then reformed to provide the other side of the channel comprising a second integral peripheral edge flange similar to the first. The first edge flange is then assembled and secured to the bowl adjacent the second edge flange in said reversed relationship to complete the wheel.

13 Claims, 18 Drawing Figures

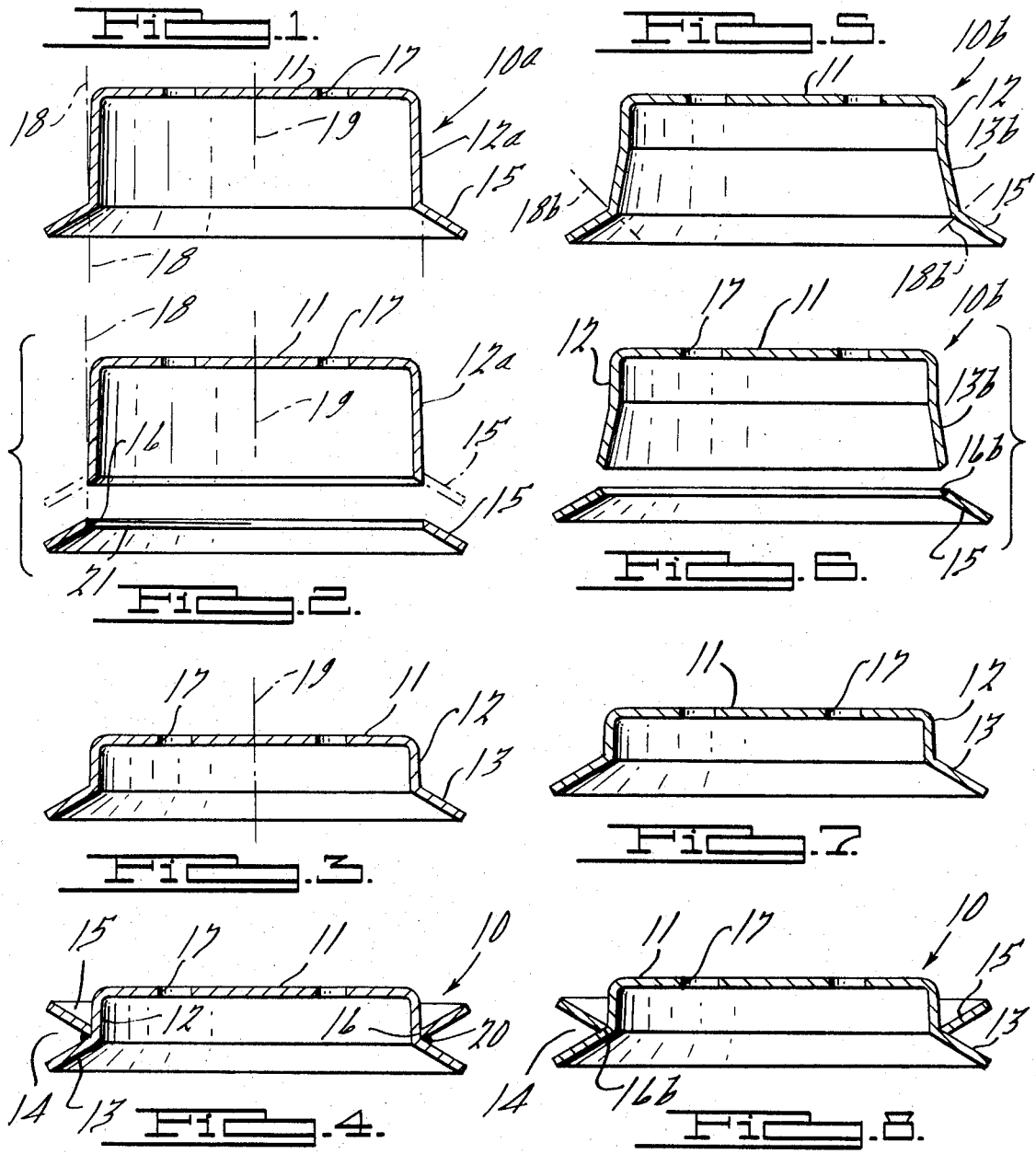

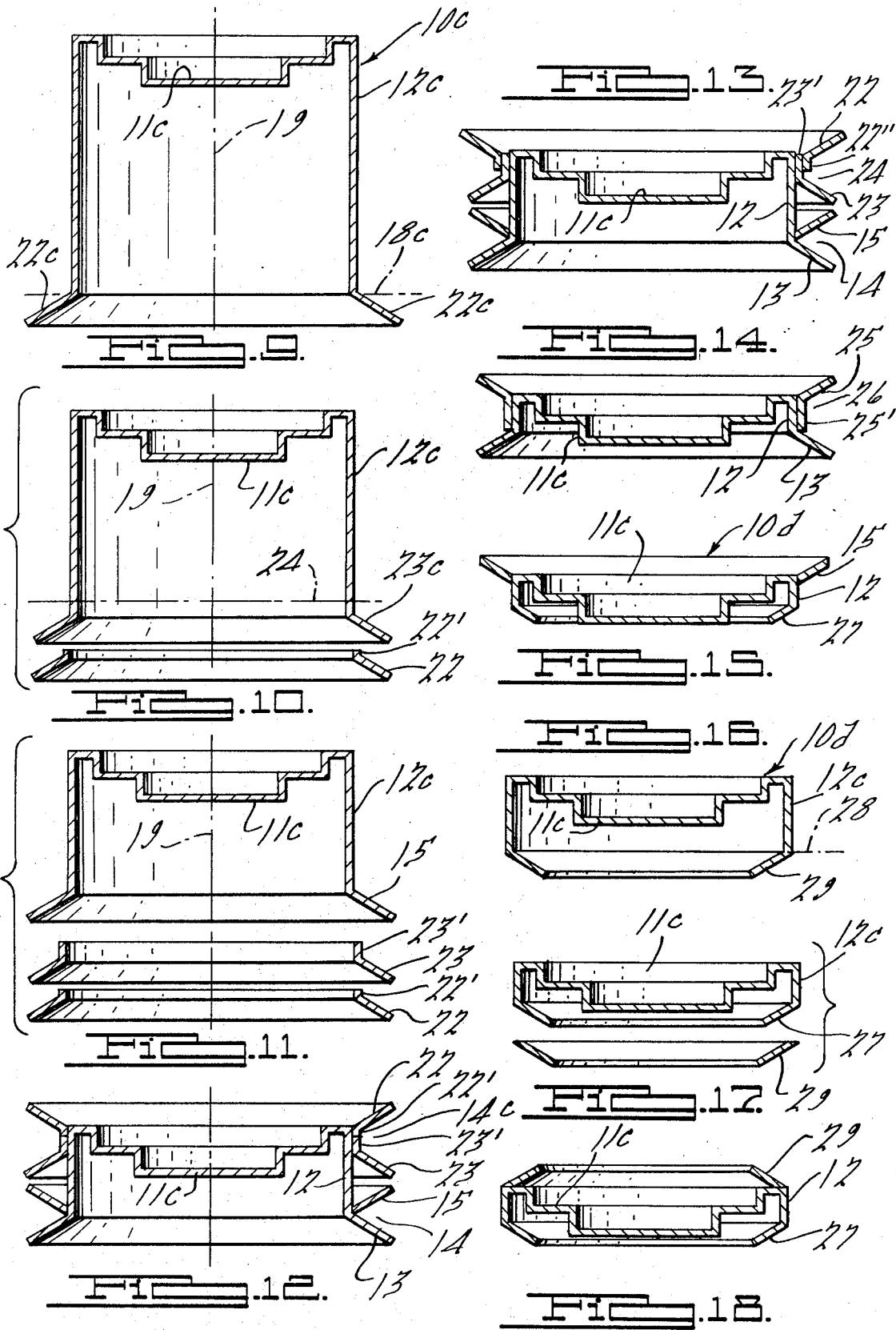

PULLEY METHOD OF MANUFACTURE

BACKGROUND AND SUMMARY OF THE INVENTION

This invention relates to improvements in the manufacture of wheels from sheet material, for example rimmed wheels suitable for multiple uses with or without a tire, and in particular relates to automobile engine driven pulleys such as the crankshaft pulley and the various V-belt connected pulleys for the cooling air fan, water pump, alternator or generator, and air conditioning pump, although it is applicable to other types of wheels capable of being manufactured from sheet material.

It has long been conventional to manufacture pulleys for example from formed sheet material to provide a pulley hub and a peripheral outwardly opening V-channel or groove for a pulley belt. Such pulleys heretofore have required reverse bends to form the V-channel, resulting in an unnecessary double thickness for one channel side, or have otherwise been formed by processes wasteful of costly sheet steel.

An object of the present invention is to provide an improved wheel, suitable for use as a pulley, and method of manufacturing the same from sheet material, such as sheet steel, which substantially eliminates waste of material and enables the economical fabrication of the wheel by conventional metal forming operations.

A more specific object is to provide a method of manufacturing such a wheel comprising the formation of a bowl from sheet steel stock, for example. The bowl is formed with a base, comprising the hub of the wheel, and an integral annular side flange which terminates outwardly from the base in an outwardly flared first annular edge flange to comprise one side of an outwardly opening peripheral groove or channel. The first annular edge flange is sheared from the bowl and the latter is reformed to provide a second integral outwardly flared annular edge flange similar to the first edge flange to provide the other side of the channel or groove. The steps of shearing and reforming may be accomplished simultaneously or as separate operations. Thereafter the first annular edge flange is assembled on the bowl adjacent and in axially reversed relationship with respect to the second annular edge flange to complete the peripheral groove or channel. The parts are then secured together, for example by screw threads or an interference fit or preferably by welding, either with or without the addition of another alloy. Thus it is to be understood that the term "welding" as employed herein includes brazing.

Other and more specific objects are to shear the first annular edge flange from the bowl to provide a cylindrical inner peripheral edge for the latter flange adapted to lie flush with the side flange of the bowl when assembled thereon in said reversed relationship, or to shear the first annular edge flange from the bowl to provide a conical inner peripheral edge for the latter flange adapted to lie flush with the second edge flange of the bowl when assembled in said reversed relationship, thereby in each instance to provide a close fit between the parts to enhance a weld therebetween.

Other objects of this invention will appear in the following description and appended claims, reference being had to the accompanying drawings forming a part of this specification wherein like reference characters designate corresponding parts in the several views.

FIG. 1 illustrates an application of the invention in the fabrication of a wheel or pulley, comprising the formation of a bowl having an integral base or hub and side flange formed from a blank of sheet material.

FIG. 2 illustrates the bowl of FIG. 1 removed from the first annular edge flange that will eventually provide one channel side of the final groove or channel for a pulley.

FIG. 3 illustrates the bowl of FIG. 2 reformed to provide the second integral annular edge flange that will comprise the other channel side of the final pulley groove or channel.

FIG. 4 illustrates the assembled pulley.

FIGS. 5–8 are views similar to FIGS. 1–4 respectively, illustrating a modification of the invention.

FIGS. 9–12 are views similar to FIGS. 1–4, illustrating another modification of the invention.

FIGS. 13, 14 and 15 illustrate other embodiments of wheels fabricated in accordance with the present invention.

FIGS. 16–18 illustrate a series of steps similar to those illustrated in FIGS. 1–4, but for the fabrication of another modification of the wheel illustrated in FIG. 15.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to FIGS. 1–4, an application of the present invention is illustrated in the formation of a pulley 10, FIG. 4, from a sheet steel blank. The pulley 10 comprises a circular hub 11 having an integral annular side flange 12 extending in one axial direction from the periphery of the hub 11 and terminating in an integral outwardly flared annular edge flange 13. The latter comprises a channel side of a V-shaped channel or groove 14 for a typical pulley belt. The structure thus far described comprises a one-piece bowl of circular section.

The other side 15 of the groove 14 comprises a separate annular conical flange diverging radially from the channel side 13 and having its inner peripheral edge 16 closely engaging the exterior surface of the side flange 12 and welded thereto. The hub 11 or base of the bowl is adapted to be secured coaxially to a rotatable member, as for example by being clamped or bolted thereto. Accordingly one or more bolt holes 17 may be provided in the base 11 for securing the latter to a rotatable member.

In fabrication of the pulley 10 without waste of material, a blank of sheet material such as sheet steel is formed in accordance with conventional practice by stamping, spinning or other means to provide a one-piece bowl 10a, FIG. 1, having the apertured base 11 and an annular integral side flange 12a. As explained below, the latter includes the material for the flanges 12 and 13 and terminates outwardly from the base 11 in the integral outwardly flared flange 15.

As illustrated in FIG. 2, the flange 15 is removed from the bowl 10a, as for example by being sheared therefrom along an annular surface 18 to provide the inner peripheral edge 16. The surface 18 may be generally cylindrical, or the diameter of the base 11 may be slightly smaller than the diameter of the inner edge 16 to facilitate assembly of the flange 15 over the base 11 in the reversed position illustrated in FIG. 4. In such an event, the side flange 12a may diverge from the base 11 at a slight angle from the axis of rotation 19. In order to effect a close fit and a strong weld between the edge 16 and the flange 12 in the final reversed position of FIG. 4, the shearing surface 18 may converge conically from the base 11 at the same conical angle with respect to the axis 19 that the side flange 12a diverges. When the flange 15 is reversed as aforesaid, the conical edge surface 16 resulting from the angle of the shear 18 will be flush with the conical exterior of the flange 12.

Either simultaneously with the removal of flange 15 from the bowl 10a or as a separate operation, the bowl 10a is reformed to provide the flange 13 as an integral outwardly flared edge of the resulting side flange 12, FIG. 3. Obviously the material of flange 12a of FIGS. 1 and 2 becomes the flanges 12 and 13 of FIG. 3. Ordinarily the flare angle of the flange 13 will be the same as the flare angle of the flange 15 in FIG. 1.

The flange 15 is then assembled coaxially on the base 11 adjacent the flange 13 in the axially reversed relationship shown in FIG. 4 to provide a generally symmetrical channel or groove 14. The separate parts are suitably secured together, as for example by welding at 20. The flange 12 may be forced outwardly against the edge 16 prior to securing the parts together, particularly if a butt weld is desired.

The welding operation may be completed with or without the addition of an additional metal alloy, and thus includes the concept of brazing. Also the edge 16 may be provided with screw threads 21 and the flange 15 may be screwed on the flange 12 in the reversed relationship shown. The screw threads 21 will be arranged to tighten the flange 15 toward the flange 13 by screw action when the pulley 10 is rotated during operation by means of a pulley belt in the groove 14.

The FIGS. 5–18 illustrate modified applications of the present invention wherein the basic operations of forming, shearing, reversing the flange 15, and securing the parts together are substantially the same as described above. In FIGS. 5–8, a bowl 10b is formed similarly to the bowl 10a, having the base 11 and an integral annular side flange. Instead of side flange 12a, a similar integral annular side flange is formed having the material for the annular integral flanges 12, 13b, and 15, FIG. 5. The flange 12 may extend either cylindrically or slightly conically from the base 11 as described in regard to flange 12a. The flange 13b comprises the material for flange 13 and diverges outwardly at a slight angle determined by the thickness of the sheet material comprising flange 12. Thus when flange 15 is subsequently sheared from the bowl 10a at the conical shearing surface 18b as described below, the resulting inner edge 16b of the flange 15 will fit closely around the flange 13.

The angle of the conical shearing surface 18b is determined so that when the flange 15 is arranged on the bowl 10b in the reversed relationship shown in FIG. 8, the conical edge 16b will lie flush against the outer surface of flange 13, FIG. 8, to facilitate welding.

As illustrated in FIG. 6, after formation of the bowl 10b of FIG. 5, the flange 15 is sheared from flange 13b along the conical shear surface 18b and the bowl 10b is reformed to bend the flange 13b to the FIG. 7 position, thereby to complete the flange 13. Thereafter the flange 15 is assembled on the reformed bowl and welded thereto in the reversed position shown in FIG. 8 to complete the pulley.

FIGS. 9–12 show a series of process steps similar to those described, but in the formation of a pulley wheel having more than one groove or channel for pulley belts. Thus in addition to groove 14, groove 14c is provided, FIG. 12. In FIG. 9, an integral bowl 10c is first formed similarly to bowl 10a or 10b. The bowl 10c has a base 11c, similar to base 11 but reinforced by a series of annular depressions, and a cylindrical side flange 12c. The latter terminates in an integral radially outwardly flared annular edge flange 22c.

The bowl 10c is reformed to shear flange 22c from side flange 12c, as for example along a shear plane 18c transverse to the axis 19, FIG. 9, and the flange 22c is reformed either simultaneously or in a separate operation to provide an outwardly flared conical flange 22 having an integral cylindrical base portion 22′ adapted to fit flush around the side flange 12, FIGS. 10–12.

Again, either simultaneously with the shearing of flange 22c from the bowl 10c or in a separate operation, the bowl 10c is reformed to provide a second annular edge flange 23c, FIG. 10, similar to flange 22—22′. The bowl 10c is then reformed a second time to shear off annular flange 23c, as for example at the transverse shear plane 24, to provide the conical flange 23 having the cylindrical base portion 23′ dimensioned to fit closely around the outer periphery of the side flange 12, FIGS. 11 and 12.

The second reforming of the bowl 10c also provides the conical flange 15 integral with the side flange 12c, which flange 15 is then sheared from the bowl 10c along a shear surface that may comprise the cylindrical outer surface of flange 12c. The shearing of flange 15 comprises part of a third reforming of the bowl 10c, which also comprises the formation of the conical flange 13 as an integral edge flange of the remaining annular side flange 12, FIG. 12, substantially as described in regard to FIG. 3.

The flanges 15, 22—22′, and 23—23′ are then assembled and secured on the side flange 12 of the bowl 10c, the flanges 15 and 22—22′ being reversed axially to cooperate with flanges 13 and 23—23′ respectively to provide the two pulley grooves 14 and 14c, FIG. 12.

As illustrated in FIG. 13, the cylindrical base portion of conical flange 22 may also be formed as at 22″ to fit closely over the base portion 23′ to effect a double peripheral reinforcement for the resulting pulley where desired. Otherwise the double groove pulley of FIG. 13 is formed as described in regard to FIGS. 1–8.

Obviously the cylindrical base portions 22′ and 23′ may be appreciably longer axially then illustrated in FIG. 12, so as to reinforce the periphery of the resulting wheel as illustrated by the conical flange 25, FIG. 14, having a cylindrical base flange portion 25′ formed to fit closely around the side flange 12 and to cooperate with flange 13 to provide an outwardly opening channel 26. The latter may receive a pulley belt or a tire for a wheel if desired.

The paired radially extending peripheral flanges of the wheels described above need not extend radially outwardly. Thus as illustrated in FIG. 15, instead of the flange 13, a flange may be formed to extend radially inwardly to effect the conical edge flange 27 integral with the side flange 12 of a bowl 10d which, except for the replacement of flange 13 by flange 27, is generally the same as one of the bowls described above. One of the flanges as described above, such as flange 15, may be secured in axially reversed relationship on the side flange 12 to provide a flanged wheel suitable for riding along a track, for example when paired with a mating mirror image wheel on a parallel track.

As illustrated in FIG. 16, instead of forming bowl 10d with a radially outwardly extending conical edge flange 15, the bowl 10d may be formed with a radially inwardly extending conical edge flange 29 which is in other respects similar to flange 15. The bowl 10d is then reformed by shearing flange 29 from flange 12c along the transverse shear line 28, FIG. 16, and by reforming flange 12c to povide the conical edge flange 27, FIG. 17. Flange 29 is assembled and secured to bowl 10d in axially reversed relationship as illustrated in FIG. 18 to provide a wheel or pulley having a rim reinforced by paired edge or rim flanges 27 and 29 and adapted to ride along a trough, or to carry a continuous flat belt, or to carry a tire overlapping the flanges 27 and 29.

Having described my invention, I claim:

1. In the method of manufacturing a wheel having a hub and a radially outwardly opening annular channel, the steps of forming a bowl having a base to provide said hub and having an integral annular side flange terminating outwardly from said base in a first radially outwardly extending annular edge flange to provide one side of said outwardly opening channel, reforming said bowl to remove said first annular edge flange therefrom and to form a second radially outwardly extending annular edge flange integral with the reformed bowl at the outer periphery of said annular side flange to provide the other side of said outwardly opening channel, and securing said first annular edge flange to said reformed bowl in axially reversed relationship with respect to said second annular edge flange to provide said annular channel.

2. In the method of claim 1, wherein said base is formed with an outer diameter smaller than the inner diameter of said first annular edge flange to facilitate assembly of the latter with said reformed bowl in said reversed relationship.

3. In the method of claim 1, the step of removing said first annular edge flange comprising shearing the same from said bowl to provide an inner peripheral edge for the latter flange generally parallel to the exterior surface of said side flange when secured in said reversed relationship.

4. In the method of claim 1, the step of removing said first annular edge flange comprising shearing the same from said bowl to provide a conical inner peripheral edge for the latter flange adapted to be flush with the second outwardly annular edge flange when secured in said reversed relationship.

5. In the method of claim 4, said step of securing comprising abutting said conical edge against said second annular edge flange and welding the parts together.

6. In the method of manufacturing a device having a bowl-shaped body defined by a base and an integral side flange, the side flange having at least a pair of peripheral flanges, the steps of forming a bowl having said base and integral side flange with the latter terminating at its outer periphery in a first integral peripheral edge flange, reforming said bowl to remove said first edge flange therefrom and to form a second peripheral edge flange integral with the outer periphery of said side flange, and securing said first edge flange on said side flange in reversed relationship with respect to its initial relationship on said side flange prior to being removed therefrom.

7. In the method according to claim 6, the step of reforming said bowl comprising the removal of said first edge flange and an integral peripheral portion of said side flange and forming the latter portion to fit closely around a portion of said side flange in said reversed relationship.

8. In the method of claim 6, said first and second peripheral edge flanges being formed to extend radially inwardly from said side flange.

9. In the method of claim 6, said bowl being formed with annular sections transverse to a principal axis, said side and edge flanges being formed annularly, and said first edge flange being secured on said side flange in axially reversed relationship with respect to its initial relationship on said side flange prior to being removed therefrom.

10. In the method of claim 9, the step of reforming said bowl comprising the removal of said annular edge flange and an integral annular portion of said side flange and of forming the latter portion to fit closely around a portion of said side flange in said reversed relationship.

11. In the method of claim 9, said first and second peripheral edge flanges being formed to extend radially inwardly.

12. In the method of claim 9, said first edge flange being sheared from said body to provide an inner peripheral edge for the latter flange generally parallel to the exterior surface of said side flange when in said reversed relationship.

13. In the method of claim 9, said first edge flange being sheared from said body to provide a conical inner peripheral edge for the latter flange flush with the second annular edge flange when in said reversed relationship.

* * * * *